July 3, 1962  G. J. OYLER  3,041,959
MEANS FOR BARBECUING MEAT
Filed Aug. 15, 1960  2 Sheets-Sheet 1
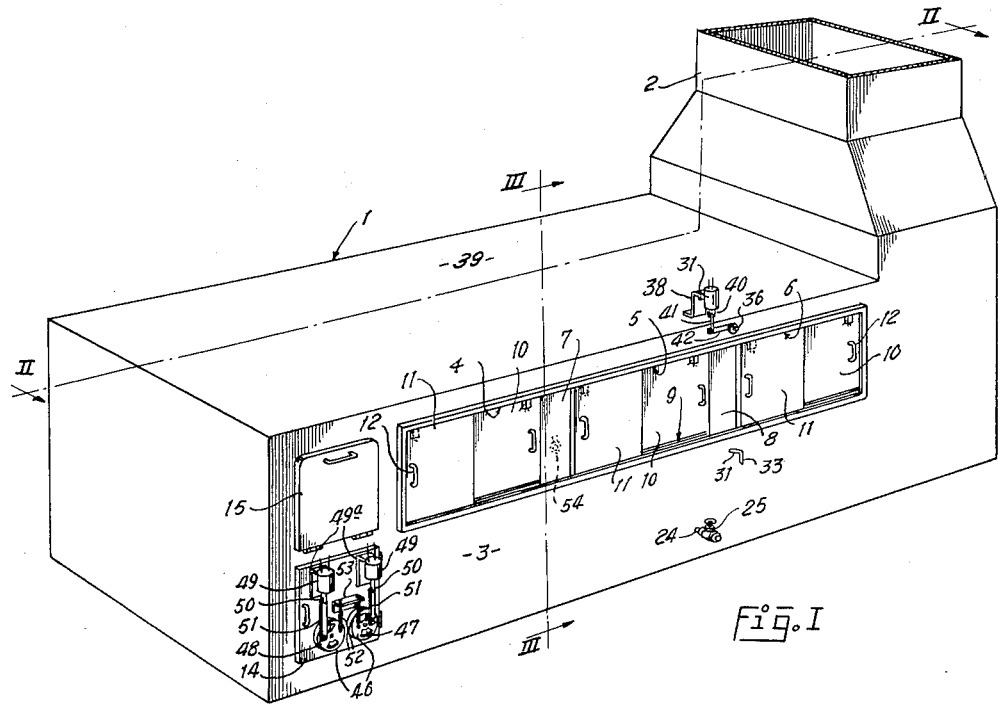
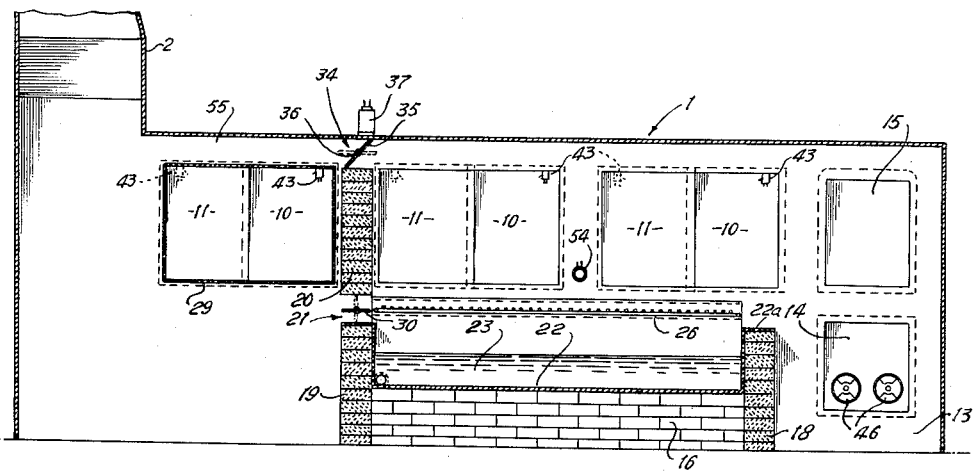
INVENTOR
Herbert J. Oyler
BY Howard E. Moore
ATTORNEY

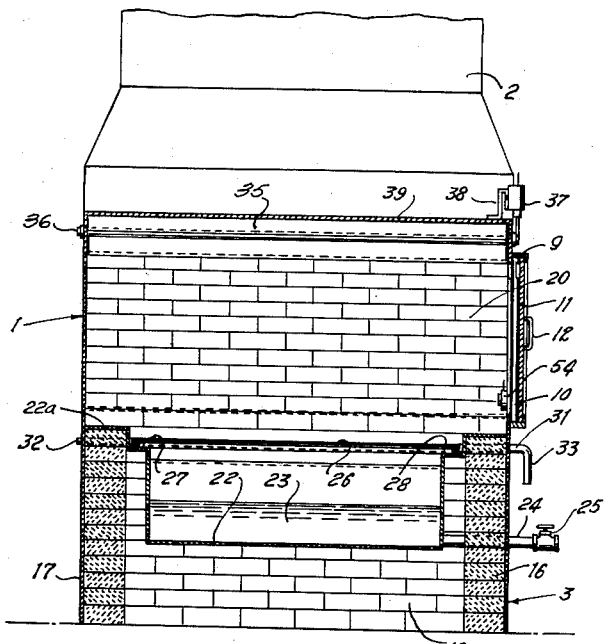
Fig. III
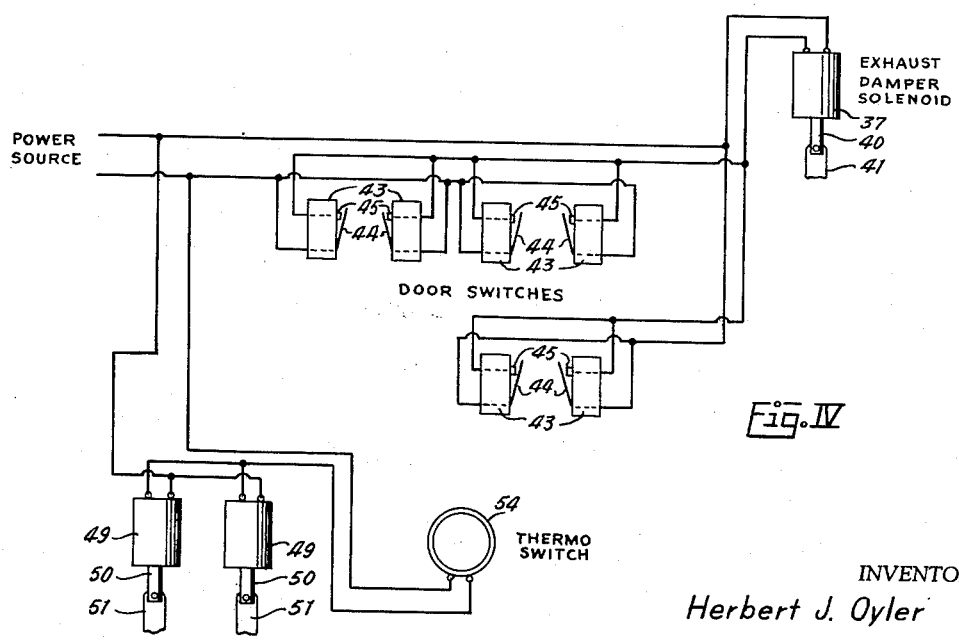
Fig. IV
INVENTOR
Herbert J. Oyler
BY Howard E. Moore
ATTORNEY United States Patent Office 3,041,959
Patented July 3, 1962

3,041,959
MEANS FOR BARBECUING MEAT
Herbert J. Oyler, 202 S. Montreal, Dallas, Tex.
Filed Aug. 15, 1960, Ser. No. 49,693
6 Claims. (Cl. 99—260)

This invention has to do with a cooking oven, and is particularly concerned with an oven for cooking meat by direct exposure to gas and smoke given off by burning wood or charcoal. Meat cooked by such method is commonly known as barbecue.

Meat cooked by such method has commonly been disposed on a grill of expanded metal or heavy wire or rod mesh, directly over a bed of coals so that the gaseous heat and smoke emanating from the coals passed upwardly about the meat to cook same.

In the use of such method the grease and other residue from the meat was allowed to drip directly into the coals, burning same, causing an unsavory odor and taste to be imparted to meat.

Furthermore, there was no way to uniformly control the heat applied to the meat, said heat being dependent upon the amount of coals disposed thereunder, the type of fuel employed, and the proximity of the grill to the coals.

Furthermore, there was no means to maintain the moistness of the meat, causing it to lose its moisture by evaporation.

As a result the meat was often seared and burned on the outside, and not uniformly cooked therethrough. It was dry, the smoke flavor was not uniformly distributed through the meat as a result of the hard, seared layer on the outside, and in many instances was unpalatable.

In some instances the meat was cooked in a closed oven, or pit, with the flue at one end for the exit of smoke and gases. In the use of such closed ovens, the smoke and heat had a tendency to take the most direct route to the flue, so that the meat at one end of the oven cooked faster than that at the other end, and the meat at the end of the oven furthest removed from the flue was not uniformly exposed to the smoke to give the desired flavor thereto. The meat at the end of the oven nearest the flue would be burned and seared, whereas that furthest removed from the flue would not be properly cooked and flavored.

In such prior devices there was no means to control the temperature to which the meat was exposed and to assure that the smoke and gases emanating from the fire would be uniformly distributed about the meat to assure uniform cooking and flavoring thereof. Moreover the said meat was unduly dried out. To overcome the tendency of the meat to quickly dry and dehydrate, it has been the uniform practice to baste the meat with a grease based sauce in an attempt to hold the moisture in and add flavor thereto. The primary objective in barbecuing meat is to cause the smoke taste from burning hickory wood to penetrate the meat and add such smoke flavor thereto. This objective is defeated when the outer surface of the meat is seared over, or when it is covered with grease based sauce which prevents the penetration of the meat by the smoke and gases from the wood.

The cooking process and oven comprising the subject matter of this invention overcomes the above described objectionable features and results of prior practices.

It is therefore, a primary object of this invention to provide a method and means of cooking barbecue wherein the meat is not directly exposed to the fire, but the gases and smoke emanating from the fire are uniformly directed over and about the meat.

Another object of the invention is to provide a method and means for barbecuing meat wherein the moisture content of the meat is maintained while it is being cooked, thereby allowing the meat to be cooked for a longer period of time without burning or searing, thus assuring that the meat is uniformly cooked and tenderized throughout and so that uniform flavor penetration of the meat is assured.

A still further object of the invention is to provide a method and means for barbecuing meat wherein the temperature to which the meat is exposed is automatically controlled and regulated, thereby assuring that the meat can be cooked for a longer period of time without burning on the outer side, so that the smoke flavor will more uniformly penetrate the meat.

Still another object of the invention is to provide a method and means for cooking barbecue where none of the drippings of grease and residue from the meat reaches the fire where it can be burned to provide an unsavory odor and flavor to the meat.

Another object of the invention is to provide a method and means for cooking barbecue wherein the grease drippings from the meat falls on the surface of water disposed in a pan underneath the meat, so that the grease and residue from the meat floats on the water, thereby preventing it from being burned, and allowing it to be easily removed by skimming off the top of the water.

A still further object of the invention is to provide a method and means for cooking barbecue wherein the smoke and gases emanating from the fire is concentrated and directed along the entire length of the grill or rack on which the meat is disposed, so as to uniformly apply the gases and smoke to the meat, thereby assuring that the meat will be uniformly cooked and the flavor of the smoke will penetrate same.

Another object of the invention is to provide a method and means for cooking barbecue wherein automatic means is provided to allow smoke and gas to be directed to the exit flue, when an access door is opened to the oven, to thereby assure that the smoke and gases will not come outwardly through the open door into the face of the operator and into the enclosure or building in which the barbecue pit may form a part.

A still further object of the invention is to provide a built-in warming oven in the cooking device in which meat which has been cooked to the desired flavor and texture can be placed so that the meat will be kept warm, will not dry out and will maintain its uniform consistency.

A general object of the invention is to provide a method and means for cooking barbecue wherein the meat is uniformly cooked throughout, is uniformly flavored throughout, is not burned or seared on the outer side, is not subjected to undue shrinkage, and to which has not been added oil-based sauces and flavoring which detract from the smoked taste of the meat.

By the method and apparatus herein described, there is produced barbecued meat of uniform quality and flavor, and tenderness, the like of which has not heretofore been known.

A suitable device for practicing the invention and for accomplishing the objects hereinbefore recited, is shown in the attached drawings in which:

FIGURE I is a front perspective view of the cooking oven;

FIGURE II is a longitudinal, cross-sectional, elevational view taken on the line II—II of FIGURE I;

FIGURE III is a transverse, cross-sectional, elevational view taken on the line III—III of FIGURE I; and FIGURE IV is a wiring diagram for the door switches, exhaust damper solenoid, thermo-switch and fire-box damper solenoids.

Numeral references are employed to indicate the various parts shown in the drawings, and like numerals designate like parts throughout the various figures of the drawings.

The numeral 1 indicates the general housing for the cooking oven which is generally rectangular in shape.

The walls of the housing may be made of metal, or they could be made of other material such as brick.

The housing 1 includes a draft flue 2. The housing 1 could be incorporated as a part of a building, with the doors thereon accessible from the inside of the building, and the flue could be extended through the roof of the building. However, it will be understood that the cooking oven could be made as a separate unit and not attached to a building. However, it is usually more convenient to incorporate it as a part of the building where the doors thereof are accessible from the inner side of the building, so that it is accessible during inclement weather, and is not subject to being tampered with by unauthorized persons.

The housing 1 includes a front wall 3 in which there is provided access openings 4, 5 and 6 which are separated by the partition portions 7 and 8.

Channels 9 are provided about the openings 4, 5 and 6 in which the overlapping sliding doors 10 and 11 are slidably disposed, there being a pair of said overlapping doors 10 and 11 in each opening.

The outer doors 11 are arranged to slide to the right as shown in FIG. I, and the inner doors 10 are arranged to slide to the left as shown in FIG. I.

The doors 10 and 11 have suitable handles 12 thereon to facilitate their operation.

The housing 1 includes a fire box 13 in which wood or charcoal may be disposed and burned for the purpose of supplying heat and smoke for cooking the meat.

An access door 14 is provided on the front wall 3 of the housing 1 for the purpose of providing access for removing the residue of burned fuel. The access door 15 provided on the front wall 3 of the housing 1 is for the purpose of adding fuel to the fire box 13.

Inside the housing 1 is provided a longitudinally extending brick wall 16, and a co-extending brick wall 17 is provided on the inner side of the back wall of the housing. The brick walls 16 and 17 provide heat insulation and also provide a supporting base for the water pan 22, hereinafter described.

Transversely extending brick walls 18 and 19 abut against the ends of the longitudinal wall 16 and 17, and extend between opposite sides of the housing 1 to provide a rectangular receptacle or trough for the water pan 22.

Another brick wall or partition 20 extends transversely across the housing 1 between opposite walls thereof, and is spaced from the lower wall 19 so as to provide a passage 21 between the walls 19 and 20 through which smoke and heat may pass from the fire box 13 after it is passed over the meat rack as hereinafter described.

A water pan 22 has flanges 22a thereon at the sides and ends thereof, which are positioned on and supported by the walls 16, 17, 18 and 19. The water pan 22 is recessed between said walls, and a quantity of water 23 is disposed therein, the level of which is below the meat rack 26.

The drain pipe 24 extends through the front wall 3 of the housing 1 and through the brick wall 16 and communicates with the water pan for the purpose of draining the water, and any grease or residue from the cooked meat, to permit the cleaning of the water pan, and so that it may be replenished with clean water periodically. A valve 25 is provided on the outer end of the drain pipe 24, which when opened, permits the draining of the water 23 from the pan 22.

A meat rack, or grill, 26 which is preferably made of expanded metal or mesh rods or heavy wire is disposed on the ledges 27 and 28 provided on the water pan 22 at each side thereof. The meat rack 26 is preferably made in sections of such size that they can be removed from the housing through the openings in the side thereof for cleaning.

A warming oven 29, which is a box-like member extending between the front and rear walls of the housing 1, is disposed so that the smoke and heat passing through the passage 21 goes underneath same in seeking exit through the flue 2. The warming oven 29 is spaced from the top of the housing 1 so as to provide a passage 55 for the purposes hereinafter mentioned.

After the meat has been cooked in the oven, it may be transferred to the warming oven 29 through the doors 10 and 11 therefor, and kept in such warming oven without direct exposure to heat so that the meat may be kept warm but will not lose its moisture content.

A butterfly type damper 30 is pivotally disposed in the passage 21 on the pivot shafts 31 and 32, extending through the walls 16, 17 and the front and rear walls of the housing 1 as shown in FIG. III. The damper 30 extends entirely across the passage 21, and is arranged to close said passage when in a position shown in broken lines in FIGURE II. The damper 30 may be operated by a handle 33 extending outwardly of the front wall 3 of the housing 1. When the damper 30 is closed, the passage 21 is closed so that no heat and smoke can pass therethrough, thereby diverting such heat and smoke through the passages 34 and 55 at the upper end of the housing, as will be hereinafter explained.

A passage 34 is provided across the housing 1 above the wall 20, which communicates with the passage 55 extending across the housing 1 above the warming oven 29.

A butterfly type damper 35 is pivotally disposed in the passage 34, and is arranged to close same when turned in the position shown in full lines in FIG. II.

A shaft 36 supports the damper 35, and rotatably extends through the rear wall of the housing 1 and through the front wall 3 of the housing 1.

The damper 35 is controlled and operated by exhaust damper solenoid 37 which is mounted on top of the housing 1 by means of a suitable bracket 38. The electric solenoid 37 includes a movable core 40 which is connected, through the pivotal links 41 and 42, to the shaft 36 of the damper 35. The solenoid 37 is normally de-energized, and in such position the damper 35 closes the passage 34. When the damper 37 is electrically energized, the core 40 is drawn thereinto, and such motion is transferred through the links 41 and 42 to rotate the shaft 36 and thereby move the damper 35 to horizontal position, as shown in broken lines in FIG. II, thereby opening the passage 34 to permit the smoke and heat in the oven to pass therethrough and through the passage 55 directly to the flue 2.

A solenoid 37 is automatically energized when one of the doors 10 or 11 is opened.

Switches 43 are mounted and attached to the housing 1 at the upper, inner sides of the openings 4, 5 and 6 in positions so that when either of the doors 10 or 11 is slid to open position the inner side thereof will engage one of the switch contacts 44 to thereby close the switch 43 and close the circuit to energize the damper solenoid 37.

Each switch 43 includes a spring contact arm 44 and a contact terminal 45. When the spring terminal 44 contacts the terminal 45 on either of the switches 43, the electrical circuit is closed energizing the exhaust damper solenoid 37. The switches 43 are connected in parallel relationship in the electrical circuit shown in FIG. IV, so that the closing of any one of said switches will energize the solenoid 37.

Therefore, it will be seen when one of the doors 10 or 11 is slid open, the inner edge thereof will engage a contact 44 of a solenoid 43, and push the contact 44 into engagement with a contact terminal 45, thus energizing the solenoid 37, causing the core arm 40 thereof to be drawn thereinto, thereby opening the damper 35 in the manner hereinbefore described.

When the door 10 or 11 is slid back to closed position, the contact arm 44 will be released, allowing it to move away from the contact terminal 45 by spring action, thereby de-energizing the solenoid 37, allowing the damper to close.

When the damper 35 is opened, the smoke which has been collected in the upper part of the oven 1 is allowed to exit through the passages 34 and 55 and through the flue 2, thereby preventing the smoke and gases from moving outwardly through the open door 10 or 11 in the front of the oven in the face of the operator. This is particularly advantageous where the access doors of the oven are inside the building, thereby preventing smoke and heat from entering the building when the doors are opened.

The dampers 46, provided on access door 14, have openings 47 therethrough communicating with the fire box 13. The openings 47 are arranged to be closed by a rotatable plate 48. The closing of the dampers 46 are controlled by damper solenoids 49, which are normally energized. The solenoids 49 are mounted on the front of the door 14 by means of suitable brackets 49a. Each solenoid 49 includes a movable core 50 which is connected by pivoted links 51 to the rotatable plates 48.

The springs 52 are connected at one end to the rotatable plate 48 and at the other end to a bracket 53, secured to the front of the door 14.

The operation of the solenoid 49 is controlled by a thermo-switch 54, which thermo-switch is normally closed, but is arranged to open when the temperature in the oven reaches a pre-determined value. Therefore, the solenoids 49 are normally energized, so that the cores 55 are drawn into the solenoids 49, pulling upwardly on the arms 57, maintaining the plate 48 in such rotative position to cause the passages through the plate and through the inner plate of the damper to be in registry, to thereby permit air to be drawn through the dampers 46 into the fire box 13 to supply oxygen to the fuel therein.

When the heat in the oven reaches a predetermined maximum value, the thermo-switch 54 is caused to open, breaking the circuit supplying a current to the solenoids 49, thereby de-energizing solenoids 49 permitting the springs 52, which are in tension, to relax, thus rotating the plates 48 counter-clockwise, causing the solid portions of the plates 48 to cover the passages through the inner plates of the dampers 46, thereby cutting off the supply of air to the fire in the fire box 13.

When the heat in the oven is reduced to a predetermined minimum value, the thermo-switch 54 will again close, energizing the solenoids 49, opening the dampers 46, to permit supply of air to the fire in the oven. This process is automatically repeated, thereby regulating the temperature in the oven.

The operation and function of the device hereinbefore described is as follows:

The fire is ignited in the fire box 13 to provide a suitable bed of coals therein to supply the heat and smoke, necessary for barbecuing meat, which is disposed on the rack 26.

The damper 30 is manually placed in position so that it is normally open. It may be adjusted to permit a desired amount of heat and smoke to pass through the passages 20 and 21.

The damper 35 is normally closed so that no appreciable amount of heat or smoke can pass through the passages 34 and 55 while the meat is cooking. However, as hereinbefore explained, when one of the doors 10 or 11 is opened, to close one of the switches 43, the solenoid 37 is energized to open the damper 34 to allow the smoke and heat to pass directly to the flue 2 through the passages 34 and 55.

When the damper 35 is closed and damper 30 open, it will be seen that heat, gases and smoke emanating from the fuel in the fire box is required to pass along the rack 26 to seek exit through the passage 21 to the flue 2. In fact, all heat and smoke in the oven must pass over the rack 26 as it seeks exit through the passage 21. Therefore, the heat and smoke is concentrated and distributed over the meat, disposed on the rack 26, so that virtually none of such heat and smoke is wasted, and the meat is uniformly cooked and flavored. By virtue of the regulation of the temperature in the oven by means of the automatically operated dampers 46, the meat is uniformly cooked, and may be cooked for a longer period of time without searing or burning.

Furthermore, the meat is uniformly exposed to smoke and flavor from the burning charcoal or wood in the fire box 13 so that the flavor uniformly penetrates the meat while it is being cooked. Furthermore, the meat is not directly exposed to the burning fuel and there is no tendency for it to be seared or burned.

Another advantage of the construction described is that grease which drips from the meat while it is being cooked falls on the surface of the water 23 and floats thereon and is not burned to impart an unsavory taste to the meat. The grease and residue from the meat floating on top of the water 23 may be easily skimmed off, and none of it is burned or caked on the pan 22, thereby facilitating the cleaning of the pan.

Furthermore as the meat cooks the water 23 in the pan 22 is caused to evaporate, adding moisture to the meat as it cooks, and replacing the moisture which evaporates therefrom. Therefore, as the meat cooks it maintains its moisture content and good texture, and is prevented from burning and drying out. Therefore, it is unnecessary to baste the meat with oil based sauce so that the true flavor of the meat and the smoke flavor which has penetrated same is assured.

After the meat has been cooked to the desired extent, it may be removed to the warming oven 29, where the flavor and moistness thereof is retained as it is kept warm.

It will be seen that I have provided a method and means for cooking barbecue in which the meat is uniformly cooked without burning or searing, the smoked flavor uniformly penetrates same, which retains its moistness, does not have to be treated with basting sauce, may be cooked longer, thus providing a more tender end product, and which is of superior quality of flavor and texture.

It will be understood that other and further modifications and devices may be devised for carrying out my invention, which still remain within the spirit and scope of the appended claims.

I claim:

1. In a device of the class described, a housing; a transverse wall extending across the housing spaced from one end thereof, and extending upwardly to a point intermediate the bottom and top of the housing; a transverse partition extending across the housing having a transverse passage therethrough substantially on the same horizontal plane as the top of the wall, and a transverse passage at the upper end thereof; a meat rack extending between the upper end of the wall and the lower side of the first named passage; a normally open damper in the first named passage; and a normally closed damper in the second named passage; a fire receptacle in the housing adjacent the wall; and a draft flue communicating with the housing between the outer end of the housing and the partition.

2. The combination called for in claim 1 with the addition of a water receptacle between the wall and the partition below the meat rack.

3. The combination called for in claim 1 with the addition of at least one slidable door in the front of the housing; a switch arranged to be closed by engagement with the door when opened; a solenoid operatively connected to the damper in the second named passage; and electrical connections between the switch and the solenoid arranged to energize the solenoid when the switch is closed to thereby operate the damper.

4. The combination called for in claim 1 with the addition of an access door to the fire compartment; a damper on said door controlling admission of air to the fire compartment; a solenoid operatively connected to the damper; a thermo-switch inside the housing, and being electrically connected to the solenoid arranged to actuate the solenoid upon a predetermined maximum temperature to thereby close the damper.

5. In a device of the class described, a housing; front and rear transverse walls extending across the housing and terminating at a point intermediate the top and bottom, and being spaced from the ends thereof; a pan suspended from the walls; a transverse partition extending across the housing, substantially in line with the front wall; a cooking rack supported by the transverse walls above the level of the pan; a passage between the front wall and the partition; a flue communicating with the passage, an enclosed warming oven disposed in the housing above the level of the passage and between the passage and the flue, whereby heated gases passing from the passage to the flue pass under the warming oven.

6. The combination called for in claim 5 with the addition of a passage between the partition and warming oven and the top of the housing communicating with the flue; and damper means in each such passage for alternately opening and closing said passages.

References Cited in the file of this patent

UNITED STATES PATENTS

| | | |
|---|---|---|
| 1,036,616 | Harrington | Aug. 27, 1912 |
| 1,189,818 | Holloway | July 4, 1916 |
| 2,137,898 | McKee | Nov. 22, 1938 |
| 2,199,584 | Bemis | May 7, 1940 |
| 2,441,994 | Di Pasquale | May 25, 1948 |
| 2,548,267 | Leichtle | Apr. 10, 1951 |
| 2,558,569 | Koch | June 26, 1951 |
| 2,568,022 | Parker | Sept. 18, 1951 |